April 24, 1928.
H. B. HATTON, JR
1,667,034
SEALING VALVE FOR GAS LINES
Filed Feb. 9, 1927
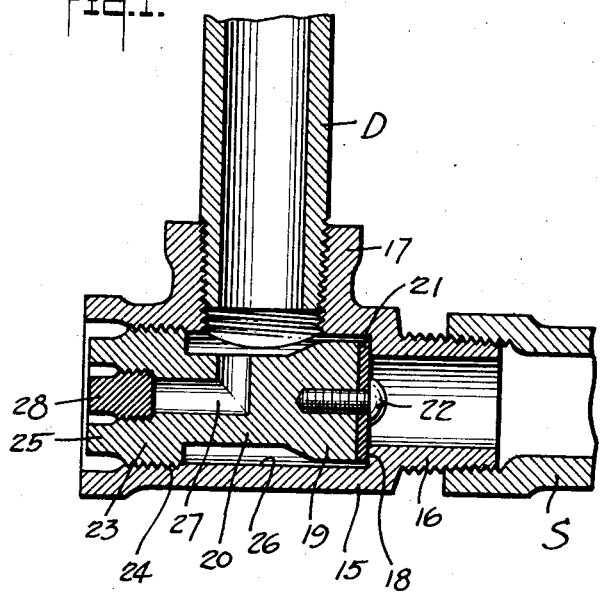
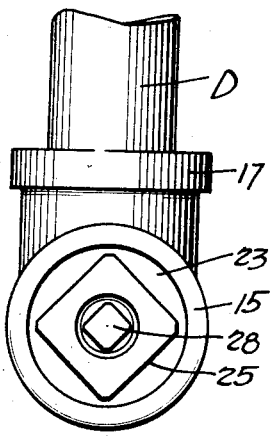
INVENTOR
HUGH B. HATTON JR.
BY Munn & Co.
ATTORNEY Patented Apr. 24, 1928.

1,667,034

UNITED STATES PATENT OFFICE.

HUGH B. HATTON, JR., OF GLENDALE, CALIFORNIA.

SEALING VALVE FOR GAS LINES.

Application filed February 9, 1927. Serial No. 166,981.

My invention relates to sealing valves for gas lines, and it has for its purpose the provision of a valve, more particularly adapted, although not necessarily, for gas lines at a point where the supply line is connected at an angle to a distributing house line, and which is adapted to be installed when sealing off the supply line, my invention being characterized by its simplicity of construction, easy installation, effectiveness in sealing the supply line against leakage and permitting the ready testing of the valve as to leakage.

I will describe only one form of sealing valve for gas lines embodying my invention, and will then point out the novel features thereof in claims.

In the accompanying drawings,

Figure 1 is a view showing in section one form of sealing valve embodying my invention in applied position to a gas line;

Figure 2 is a view showing the sealing valve in end elevation and in applied position to the gas line.

Referring specifically to the drawings, my invention, in its present embodiment, comprises a pipe designed for connecting a supply line S to a distributing line D, the pipe in the present instance being in the form of a T in order to connect the lines S and D in right angular relation to each other. This pipe, in the present instance, comprises an elongated tubular body 15 provided at one end with an exteriorly threaded nipple 16 for connecting the body to a gas supply line S. Between the ends of the body 15 is a second nipple 17 interiorly screw-threaded for connection to the distributing line D. The body 15 is provided with an annular valve seat 18 at a point adjacent its connection with the nipple 16, and against this shoulder is adapted to seat the head 19 of an elongated valve body 20. The head 19 carries a washer 21 preferably formed of fiber and secured thereto by a screw 22, the mounting of the washer being such as to engage the seat 18 when the valve head is in closed position, as illustrated in Figure 1.

The valve body 20 includes an adjusting head 23 on the opposite end of the body from the valve head 19, this adjusting head being exteriorly threaded as indicated at 24 for engagement with the inner wall of the body 15 and to thereby permit adjustment of the valve body as a unit to seat or unseat the valve head 19 with respect to the seat 18. The head 23 is provided at its outer end with an angular flange 25 which constitutes a head polygonal in form to which a suitable wrench can be applied for rotating the valve body as a unit in effecting an adjustment of the valve head 19.

As clearly shown in Figure 1 that portion of the valve body 20 between the heads 19 and 23 is of reduced diameter to provide a chamber 26 between the valve body and the inner wall of the pipe body 15. An L-shaped duct 27 is formed in the valve body in such manner that its inner end communicates with the chamber 26, while its outer end extends through the adjusting head 23 for communication with atmosphere. This latter end of the duct is normally closed by a screw plug 28, the head of which is of polygonal form to which a suitable wrench can be applied for removing or applying the plug. It is important to note that the relation of the flange 25 with respect to the adjacent end of the pipe body 15, and the relation of the flange 25 with respect to the plug 28 is such that a special form of socket wrench is necessary to manipulate the valve body and the plug. As a result, surreptitious tampering with the adjusting head and plug is minimized.

In practice, the pipe or connector can be employed to permit the free passage of gas from the line S to the line D, the valve body 20 being removed from the pipe and a conventional plug (not shown) threaded in the pipe in place of the adjusting head 23. This plug serves to close the adjacent end of the pipe, yet permitting the free passage of gas from one line to the other.

When it is desired to seal off the supply line in respect to the distributing line, the screw plug aforementioned is removed and the valve body 20 inserted, the adjusting head threadedly engaging the inner wall of the pipe body so that by rotation of the valve body the valve head 19 can be moved into firm engagement with the seat 18, thereby effectively sealing the nipple 16 against gas leakage. The valve can be tested as to leakage by a removal of the plug 28 and applying liquid soap to the outer end of the duct 27. If the soap bubbles it discloses the fact that the valve is leaking, as any gas passing the valve head will be free to enter the inner end of the duct from the chamber 26.

Although I have herein shown and described only one form of sealing valve for gas lines embodying my invention, it is to be understood that various changes and modifications may be made therein without departing from the spirit of the invention and the spirit and scope of the appended claims.

I claim:

1. A sealing valve for gas lines comprising a pipe having a seat therein, and a valve body having a valve head at one end and an adjusting head at the other threaded in the pipe to permit adjustment of the valve head to engage said seat, the valve body between the heads being reduced in diameter to provide a chamber between the pipe and valve body, a duct in the valve body extending through the adjusting head and communicating with said chamber, and a plug for closing the duct.

2. A sealing valve for gas lines comprising a T-shaped pipe body including an elongated tubular body, a connecting nipple at one end of the body, and a second connecting nipple between the ends of the body, a valve seat within the valve body adjacent its point of connection with the first nipple, a valve body insertable into the pipe body and including a valve head, and an adjusting head threaded in the pipe body to permit adjustment of the valve head to engage or disengage said seat, a duct in the valve body extending through the adjusting head, and a plug for the duct.

3. A sealing valve for gas lines as embodied in claim 2, wherein the adjusting head is provided with a flange constituting a head of polygonal form, and the plug is provided with an extension constituting a head of polygonal form, the flange being in spaced relation to the pipe body and the extension in spaced relation to the flange, and the flange and extension terminating substantially flush with the adjacent end of the pipe body.

4. A sealing valve for gas lines comprising a pipe having a seat therein, and a valve body having a valve head and an adjusting head adjustable in the pipe to permit adjustment of the valve head to engage said seat, the pipe and valve body being so related as to provide a chamber between the two, intermediate the heads of the body, said body having a duct communicating with said chamber and opening to the atmosphere, and a plug for closing the duct.

5. A sealing valve comprising a pipe adapted to connect a gas supply line with a distributing line and provided with a valve seat, a valve body adjustable in the pipe and having a valve adapted to engage said seat and thereby prevent passage of gas from the supply line to the distributing line, the pipe and body being so related as to provide a chamber between the two, means in the body defining a passage communicating with the chamber and with atmosphere through which any gas from the supply line escaping past the valve of the body into said chamber will be vented for detection, and means for closing the last means from atmosphere.

HUGH B. HATTON, Jr.